UNITED STATES PATENT OFFICE.

JEAN ALTWEGG AND JOANNY LANDRIVON, OF LYON, FRANCE, ASSIGNORS TO SOCIETE CHIMIQUE DES USINES DU RHONE (ANCIENNEMENT GILLIARD, P. MONNET ET CARTIER), OF PARIS, FRANCE.

PROCESS FOR THE MANUFACTURE OF NEW MONO- AND DI-β-OXYETHYL-AMINO-BENZOIC ESTERS.

1,418,900.  Specification of Letters Patent.  Patented June 6, 1922.

No Drawing.   Application filed June 13, 1919.   Serial No. 303,972.

*To all whom it may concern:*

Be it known that we, JEAN ALTWEGG, a citizen of the Confederation of Switzerland, and JOANNY LANDRIVON, a citizen of the Republic of France, both residents of Lyon, France, have invented a certain new and useful Process for the Manufacture of New Mono- and Di-β-Oxyethyl-Amino-Benzoic Esters, of which the following is a specification.

This invention has for its object the manufacture of the mono- and di-β oxyethyl-aminobenzoic esters, having for general formula respectively $$OHCH_2CH_2NHC_6H_4COOR$$

and $$(OHCH_2CH_2)_2NC_6H_4COOR$$

where R represents an alkyl radical. According to this invention, the mono- and di-β oxyethylamino benzoic esters can be obtained by heating to temperatures varying from 50° to 110° C. a mixture of ethylene oxide and of an aminobenzoic ester in molecular proportion of one or two of ethylene oxide, respectively, to one of the aminobenzoic ester. The reaction is simply a reaction of addition and can be accelerated by adding small quantities of water or of ethyl alcohol. The new esters are crystalline products, insoluble in water but very soluble in most organic solvents.

Example 1: A mixture of one molecular proportion of ethyl paramino benzoate and one molecular proportion of ethylene oxide are heated for several hours in a closed vessel at a temperature of approximately 50° C. When the reaction is complete, the ethyl-β-oxyethyl-paramino-benzoate so obtained, having for formula $$OHCH_2CH_2NHC_6H_4COOC_2H_5$$

is distilled under reduced pressure. It is a colourless crystalline substance of melting point 63° C. and boiling point 213° to 214° C. at a pressure of 4 mm. of mercury.

Example 2: In operating as in Example 1, by using two molecular proportions of ethylene oxide, and adding small quantities of water and alcohol, one obtains similarly ethyl di-β oxyethyl-paramino benzoate, having the formula $$(OHCH_2CH_2)_2NC_6H_4COOC_2H_5$$

It is a solid substance, and after being recrystallized from benzene it occurs in the form of white lamellæ of melting point 94° C. and boiling point 246° C. at a pressure of 3 to 4 mm. of mercury.

The new and industrial products the β oxyethyl-paramino benzoic acid ethyl esters herein described are crystalline and stable compounds, very little soluble in water, fairly soluble in dilute alcohol, very soluble in most organic solvents and in fatty bodies, soluble in diluted mineral acids, from which they are precipitated by alkalis, capable of being distilled under reduced pressure without decomposition and possessing very remarkable local anesthetic properties specially suitable for dentistry, these properties being very superior to those of the p. amino benzoic acid esters utilized heretofore. The products also constitute raw material for the manufacture of very important therapeutical products.

It is understood that the above examples are given by way of illustrative example only and may be varied in details according to the particular reagents employed.

What we claim and desire to secure by Letters Patent is:—

The new industrial products comprising the β-oxyethyl-paramino benzoic acid ethyl esters having the formula $$HO-CH_2-CH_2-NH-C_6H_4-COOC_2H_5$$

In witness whereof we have hereunto signed our names in the presence of two subscribing witnesses.

JEAN ALTWEGG.
J. LANDRIVON.

Witnesses:
MARIN VACHON,
LOUIS ESCHER.